United States Patent
McNew (10) Patent No.: US 9,262,924 B2
(45) Date of Patent: Feb. 16, 2016

(54) ADAPTING A WARNING OUTPUT BASED ON A DRIVER'S VIEW

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/327,019

(22) Filed: Jul. 9, 2014

(65) Prior Publication Data

US 2016/0009175 A1   Jan. 14, 2016

(51) Int. Cl.
*G08G 1/16* (2006.01)
*G08B 5/22* (2006.01)
*H04N 13/04* (2006.01)
*G01C 21/36* (2006.01)

(52) U.S. Cl.
CPC .............. *G08G 1/167* (2013.01); *G01C 21/365* (2013.01); *G08B 5/22* (2013.01); *H04N 13/0484* (2013.01)

(58) Field of Classification Search
CPC ... G08G 1/167; H04N 13/0484; G01C 21/365
See application file for complete search history.

(56) References Cited

U.S. PATENT DOCUMENTS

| | | | |
|---|---|---|---|
| 7,519,459 B2 | 4/2009 | Ito et al. | |
| 7,710,248 B2 | 5/2010 | Greene et al. | |
| 8,184,008 B2 | 5/2012 | Uozumi et al. | |
| 8,537,000 B2 | 9/2013 | Nakagoshi et al. | |
| 8,594,974 B2 * | 11/2013 | Kumon et al. | 702/152 |
| 8,937,536 B2 * | 1/2015 | Hatakeyama et al. | 340/435 |
| 9,061,632 B2 * | 6/2015 | Toyofuku | |
| 9,063,328 B2 * | 6/2015 | Park et al. | |
| 2005/0052348 A1 * | 3/2005 | Yamazaki et al. | 345/44 |
| 2009/0233633 A1 | 9/2009 | Morrison | |
| 2010/0220892 A1 | 9/2010 | Kawakubo | |
| 2011/0196571 A1 | 8/2011 | Foladare et al. | |
| 2012/0268262 A1 | 10/2012 | Popovic | |
| 2013/0249395 A1 * | 9/2013 | Hatakeyama et al. | 315/77 |
| 2013/0249684 A1 * | 9/2013 | Hatakeyama et al. | 340/435 |
| 2013/0325202 A1 | 12/2013 | Howard et al. | |
| 2014/0139655 A1 * | 5/2014 | Mimar | 348/77 |

FOREIGN PATENT DOCUMENTS

| | | |
|---|---|---|
| JP | 2005-135037 | 5/2005 |
| JP | 2010-039919 | 2/2010 |

* cited by examiner

*Primary Examiner* — Van Trieu
(74) *Attorney, Agent, or Firm* — Oblon, McClelland, Maier & Neustadt, L.L.P.

(57) ABSTRACT

A human machine interface (HMI) can communicate warnings and messages to a driver by selecting among a variety of warning devices based on information related to the driver's viewing angle. The variety of warning devices can include a primary-visual warning device (e.g., a heads up display), secondary-visual warning devices (e.g., an instrument cluster or a navigational screen), a portable device (e.g., a tablet or a cellular phone), an audio system, or a haptic device. The HMI apparatus displays warnings on visual warning devices within the driver's view, can signal an active portable device to output a warning. Visual warnings can include directional cues. Audio warnings may accompany the visual warnings, and can be output with greater intensity when no visual devices are within the driver's view.

20 Claims, 8 Drawing Sheets

ADAPTING A WARNING OUTPUT BASED ON A DRIVER'S VIEW

BACKGROUND

1. Field

This disclosure relates to human machine interfaces, and more particularly to human machine interfaces in motor vehicles.

2. Description of the Related Art

Some motor vehicle technologies, such as collision avoidance systems, monitor the environment for hazards and adapt the motor vehicle to compensate for hazards. The environment outside the vehicle is monitored using a variety of sensors, such as radars, infrared, and optical detectors to detect collision threats. Often when hazards are detected by the sensors, these hazards trigger warnings to the driver.

For example, U.S. Pat. No. 8,184,008 to Uozumi et al. describes measuring a dozing state of a driver and issuing a warning output, using a buzzer, when the driver's eyes close longer than a predetermined interval.

SUMMARY

According to aspects of this disclosure, one or more of a plurality of visual warning devices are determined to be within a first determined viewing angle of a driver, and a first visual warning device, from among the one or more of the plurality of visual warning devices, is signaled to output a first visual warning when the first visual warning device is determined to be within the first determined viewing angle of the driver. The viewing angle of the driver can be determined based on one of an image of the driver, an image in the direction of a view of the driver, and positional data of the driver.

A determination can be made as to whether none of the plurality of visual warning devices are within the first determined viewing angle of the driver. If so, then an at least one non-visual warning device can be signaled to output a first non-visual warning at a first warning level when none of the plurality of visual warning devices are within the first determined viewing angle of the driver.

An activity status of a portable device can also be determined. The portable device can be signaled to output a portable-device warning when the portable device is determined to be active based on the activity status of the portable device.

The portable device can be determined to be within the viewing angle of the driver. If so, then the portable device can be signaled to output the portable-device warning when the portable device is determined to be recently active and the portable device is determined to be within the viewing angle of the driver.

A determination can be made as to whether the driver is looking towards the portable device based on an image from the portable device. If so, then the portable device can be signaled to output the portable-device warning when either there is a determination that the driver is looking towards the portable device or when the determination of whether the driver is looking towards the portable device is inconclusive.

A second visual warning device of the plurality of visual warning devices can be determined to be within a second determined viewing angle of the driver. The second visual warning device can be signaled to output a second visual warning when the second visual warning device is within the second determined viewing angle of the driver.

The at least one non-visual warning device can be signaled to output an augmenting non-visual warning at a second warning level when at least one of the plurality of visual warning devices is outputting a first visual warning, wherein the second warning level is at a level that is lower than the first warning level.

At least one of the first visual warning, the second visual warning, the first non-visual warning, the augmenting non-visual warning, and the portable-device warning can be modified to increase a level of the respective warning when the response of the driver does not satisfy a first predetermined criterion.

The first visual warning device can be determined to be within the first determined viewing angle of the driver according to the first determined viewing angle corresponding to a direct view of the driver. The second visual warning device can be determined to be within the second determined viewing angle of the driver according to the second determined viewing angle corresponding to an extended view of the driver.

At least one of the plurality of visual warning devices can be signaled to output an augmenting visual warning when none of the plurality of visual warning devices are within the view of the driver.

An activity log of the portable device can be obtained and compared to an active criterion and to a recently-active criterion. The portable device can be determined to be active when the activity log satisfies the active criterion. The portable device can be determined to be recently-active when the activity log satisfies the recently-active criterion and does not satisfy the active criterion. The portable device can be determined to be inactive when the activity log does not satisfy the recently-active criterion and does not satisfy the active criterion.

The at least one non-visual warning device can include at least one of a mechanical transducer in the brake pedal, a mechanical transducer in the driver's seat, a heating ventilation and air conditioning system, a mechanical transducer that tightens the seat belt, an audio speaker, a haptic warning device, and a auditory warning device.

The plurality of visual warning devices can include at least one of a heads-up display, a navigational screen, an instrument cluster, a side view mirror, and a rear view mirror.

The at least one non-visual warning device can include a visual output. The portable-device warning can be at least one of a visual warning, an auditory warning, and a haptic warning. At least one of the plurality of visual warning devices can include a non-visual output, including an auditory output or a haptic output.

The at least one of the first visual warning, the first non-visual warning, and the portable-device warning provides directional cues that guide a view of the driver in a predetermined direction.

A first non-visual warning device can be signaled output a warning. The driver's grip on the steering wheel can be monitored and changes in the viewing angle of the driver can be monitored to determine whether the driver is responsive to the warnings. When the driver is determined to not be responsive to the warnings, the warnings can be modified to better capture the driver's attention.

Aspects of this disclosure can be implemented in one or more methods, processes, devices, systems, and/or vehicles. However, this list is not limiting and other implementations are possible.

An exemplary system can include: a driver-monitor device configured to detect a viewing angle of a driver; a plurality of warning devices, including a plurality of visual warning devices and at least one non-visual warning device; and control circuitry. The control circuitry can be configured to:

determine which of the plurality of visual warning devices is within the viewing angle of a driver; signal a first visual warning device, from among the plurality of visual warning devices, to output a first visual warning when the first visual warning device is determined to be within the determined viewing angle of the driver; signal the non-visual warning device to output a first non-visual warning when no visual warning device is determined to be within the determined viewing angle of the driver; determine whether the driver is responsive to the first visual warning or the first non-visual warning; and signal a portable device to output a portable-device warning when the driver is determined to not be responsive to the first visual warning or the first non-visual warning.

BRIEF DESCRIPTION OF THE DRAWINGS

A more complete understanding of this disclosure is provided by reference to the following detailed description when considered in connection with the accompanying drawings, wherein.

DETAILED DESCRIPTION

According to aspects of this disclosure, an intelligent warning system can use information of a driver's viewing angle to tailor warnings and other messages to be output on visual devices, portable devices, and non-visual devices in order to target the driver's current viewing angle so as to more effectively warn or otherwise communicate with the driver. The driver's viewing angle is used to determine both where (e.g., on which of the various warning devices) and how (e.g., the intensity of the warning output and whether a visual or non-visual warning is better) to output warnings using various warning devices in order to tailor the warning outputs to more effectively communicate to the driver. The driver's viewing angle and other actions, such as hand position on a steering wheel, can be used to determine whether to augment or modify a warning, or to use a different warning device.

For example, a process can include displaying warnings on visual warning devices within the driver's direct view. If no visual warning devices are within the driver's direct view, then warnings can be displayed on warning devices within drivers extended view. If no in-vehicle visual warning devices are within the direct of extended view of the driver, then warnings can be pushed onto the driver's portable device when the warning device is currently active. Also, warnings can be output using non-visual warning devices, such as audio speakers, either to augment the visual warning devices or as the primary warning output.

Tailoring the warning device or a combination of warning devices that output a warning based on the driver's viewing angle can improve the warning's effectiveness, minimize the driver's reaction time by targeting those sensory perceptions with shorter neural pathways, and avoid desensitizing the driver by excess warnings. A driver's view (i.e., a view of a driver) is a driver's viewing direction based on a direction of the driver's eyes, a driver's viewing direction based on a direction/position of the driver's head, or a combination thereof. The warnings are intended to stimulate a response from the driver, where the response can be to merely focus the driver's attention or to cause the driver to take a specific physical action. However, the form of the response is not limited to these examples.

Figure 1A:
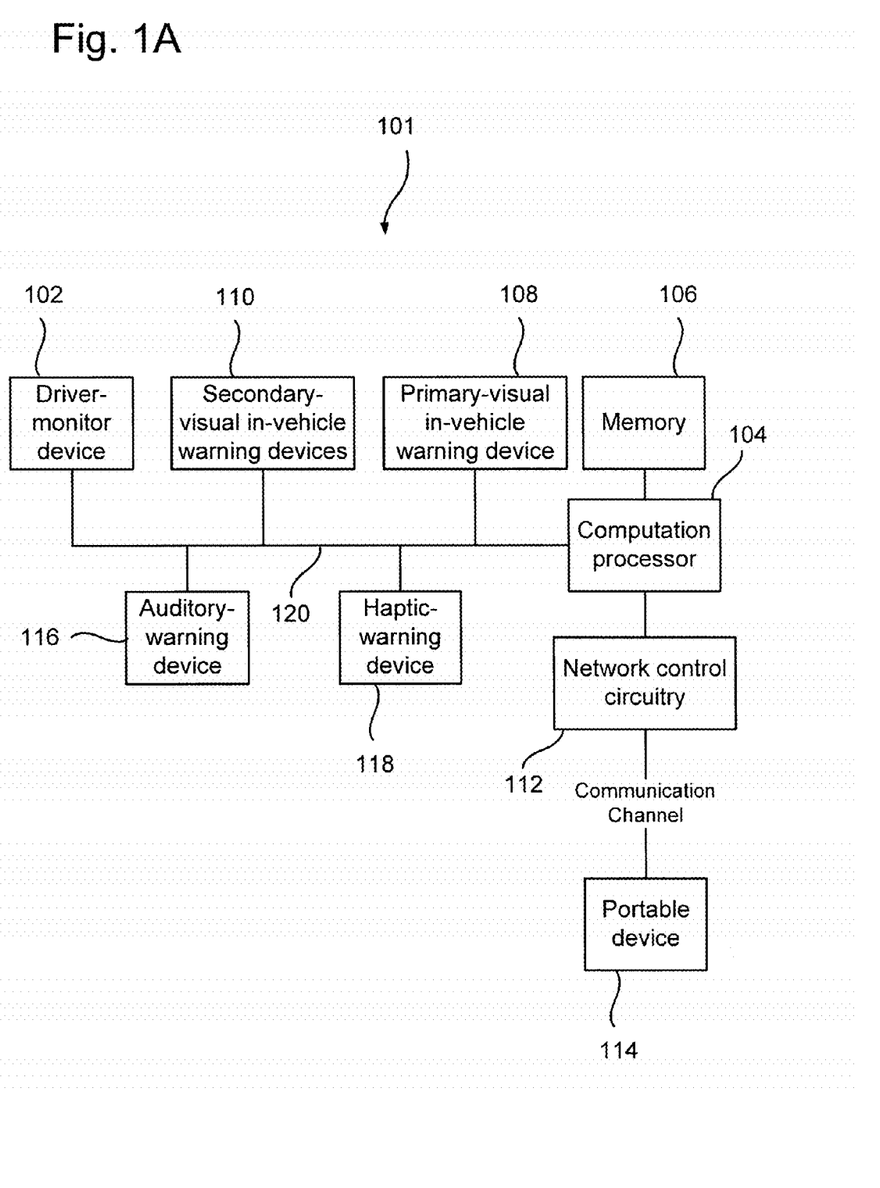
FIG. 1A shows a schematic diagram of an implementation a human machine interface (HMI) warning apparatus.

Referring now to the drawings, wherein like reference numerals designate identical or corresponding parts throughout the several views, FIG. 1A shows a schematic view of an exemplary implementation of a human machine interface (HMI) warning apparatus 101 in a motor vehicle.

The HMI warning apparatus 101 includes a driver-monitor device 102 to detect information related to the driver's current viewing angle (i.e., indicia of the viewing angle of the driver). In an implementation, the driver-monitor device 102 can be an in-vehicle driver-monitor device such as a video camera, charge coupled device (CCD) camera, or complementary metal-oxide-semiconductor (CMOS) camera that captures images of driver. Other cameras, such as infrared cameras, can also be utilized. The cameras can also be utilized with or replaced by time-of-flight sensors to recognize objects or features, such as a lidar (light detection and ranging) device. The driver images are processed using image processing circuitry to obtain information related to the driver's viewing angle. The image processing circuitry can be integrated with the driver-monitor device 102 or can be external to the driver-monitor device 102 (e.g., the image processing circuitry can instead be integrated with a computation processor 104).

In an implementation, the driver-monitor device 102 can also be incorporated into or a part of a wearable device, such as Google Glass™. The wearable device can be configured to detect the orientation of the driver's head, the direction of the driver's eyes, or other information related to the viewing angle of the driver. In an implementation, the driver-monitor device 102 can be a camera on a portable device such as a tablet or a cellular phone that is configured to obtain information related to the viewing angle of the driver. The driver-monitor device 102 provides information related to the viewing angle of the driver. The driver-monitor device 102 can also be a combination of abovementioned implementations that is configured to provide information related to the viewing angle of the driver.

The images and information of the driver-monitor device 102 can be processed and stored on the driver-monitor device 102, or the images can be stored and processed by the computation processor 104 having a memory 106. The images and information can also be stored on the memory 106 and processed later in order to detect changes in the viewing angle. The various processing described herein can be performed locally or in combination with external processing by, e.g., remote processing circuitry.

In an implementation, the computation processor 104 compares the viewing direction of the driver with the locations of various warning devices and makes decisions about which warning devices will be most effective to communicate a warning to the driver. The computation processor 104 can also perform computations to determine whether hazards exist and what warning level is appropriate.

In addition to processing driver images, the computation processor 104 can serve many other functions such as determining the warning intensity level, coordinating the warnings a various devices, and monitoring hazards to initiate/conclude warnings. Numerous factors can influence the decisions made by the computation processor 104. For example, the choice of which warning devices output warnings, the choice of the warning intensity level, and the manner in which the warning outputs are coordinated can each be influenced by the type of hazard originating the warning (e.g., driver fatigue, pedestrian ahead, collision, slow traffic), the relative effectiveness of mitigating actions (e.g., braking, swerving, and directing the driver's view in a particular direction), and the driver's current viewing angle. The computation processor 104 can also rely on data in memory (e.g., the driver's previous viewing angle) used to evaluate the driver's response to the warnings and update the warning to account for the driver's response to the warning outputs and to changing circumstance. For example, the warnings can be escalated to a higher warning intensity level, if the driver is not responding appropriately to the warnings. Generally, the computation processor 104 handles the primary computational and decision tasks associated with the HMI warning apparatus 101.

The computation processor 104 can be a Xenon or Core processor from Intel of America or an Opteron processor from AMD of America, or may be other processor types that would be recognized by one of ordinary skill in the art, such as an ARM-based processor. The computation processor 104 may be implemented on an FPGA, ASIC, PLD or using discrete logic circuits, as one of ordinary skill in the art would recognize. Further, the computation processor 104 may be implemented as multiple processors cooperatively working in parallel to perform the instructions of the inventive processes described above. The process data and instructions for the computation processor 104 may be stored in the memory 106. These processes and instructions may also be stored on a storage medium disk such as a hard drive (HDD) or portable storage medium or may be stored remotely. Further, the claimed advancements are not limited by the form of the computer-readable media on which the instructions for performing the HMI warning method are stored. For example, the instructions may be stored on CDs, DVDs, in FLASH memory, RAM, ROM, PROM, EPROM, EEPROM, hard disk or any other information processing device. The memory 106 can be a storage medium disk such as a hard drive (HDD), portable storage medium, or FLASH memory.

The HMI warning apparatus 101 includes a primary-visual in-vehicle warning device 108, such as a heads up display or an instrument cluster. Regardless of which display device is the primary-visual in-vehicle warning device 108, the primary-visual in-vehicle warning device 108 is visible to the driver when the driver's view is straight-ahead with "eyes on the road" (i.e., the visual display is within the driver's view when the driver's view is straight-ahead along the forward trajectory of the motor vehicle).

A visual warning on the primary-visual in-vehicle warning device 108 can take many forms. In an implementation, a visual warning output on the primary-visual in-vehicle warning device 108 will be displayed as text. In an implementation, the visual warning is displayed as a pattern of symbols that can be flashing, constant, or varying in position and size. Also, in an implementation, the visual warning will provide directional cues for the driver. The warning can be displayed as any combination of text, symbols, arrows, directional cues, or other visual display configured to communicate information or stimulate an emotion.

The HMI warning apparatus 101 can include secondary-visual in-vehicle warning devices 110, such as a navigational screen, instrument cluster, rear-view or side-view mirrors displays, warning lights, and other LCD/LED-type displays that are visible from the driver's perspective. The visual warnings displayed on the secondary-visual in-vehicles warning devices 110 can include text, symbols, patterns, directional cues, spatially/temporally varying backgrounds, or other visual pattern configured to communicate information or stimulate an emotion.

The HMI warning apparatus 101 includes network control circuitry 112 configured to communicate with a portable device 114. The portable device 114 can be a tablet, a cellular phone, a smartphone, wearable technology such as Google Glass™, a smartwatch, or wireless user equipment. The network control circuitry 112 transmits and receives messages from the portable device 114. The network control circuitry 112 is configured to communicate with at least one device but can also be configured to communicate with multiple portable devices. The network control circuitry 112 can include Bluetooth, a wireless local area network, an IEEE 802 network, an infrared communication network, a Wi-Fi network, and/or a wired interface.

The HMI warning apparatus 101 can also include warning devices configured to warn the driver using non-visual means. For example, HMI warning apparatus 101 can include an auditory-warning device 116 that is configured to transmit auditory warnings. These auditory warnings can be transmitted by an audio loudspeaker, a piezoelectric transducer, magnetostrictive transducer, electrostatic transducer, or other sound transducer. The auditory-warning device 116 can also be a standard vehicle audio system. The auditory warnings can be output as spoken words, chimes, alarms, music, or other sound configured to communicate information or stimulate driver emotion/response.

The HMI warning apparatus 101 can also include a haptic-warning device 118 to warn the driver through the driver's tactile sense. The haptic-warning device 118 can be a mechanical transducer connected to a seat, a brake pedal, a seat belt, a steering wheel, or other part of the vehicle that is in physical contact with the driver. The haptic-warning device 118 can also be air blown from the vehicles ventilation system and other forms of tactile communication configured to alert or otherwise communicate information or stimulate an emotion to the driver.

Each of the driver-monitor device 102, the primary-visual in-vehicles warning devices 108, the secondary-visual in-vehicles warning devices 110, the auditory-warning device 116, and the haptic-warning device 118 is connected to the computation processor 104 by means of an in-vehicle communication system 120. This in-vehicle communication system 120 can be direct wiring, a controller area network (CAN) bus, a local area network (LAN) bus, or other network bus.

In an implementation shown in FIG. 1 A, the driver-monitor device 102 the driver-monitor device interfaces with the computation processor 104 through the network control circuitry 112 rather than through the in-vehicle communication system 120.

In another implementation, the network control circuitry 112 could interface with the in-vehicle communication system 120 rather than interfacing directly with the computations processor 104. The HMI warning apparatus 101 can be implemented, in some examples, as one or more electronic units or as programmed circuitry, which can be installed in one or more places in or on a vehicle. Thus, aspects of processing can be performed in a distributed manner in some implementations.

Figure 1B:
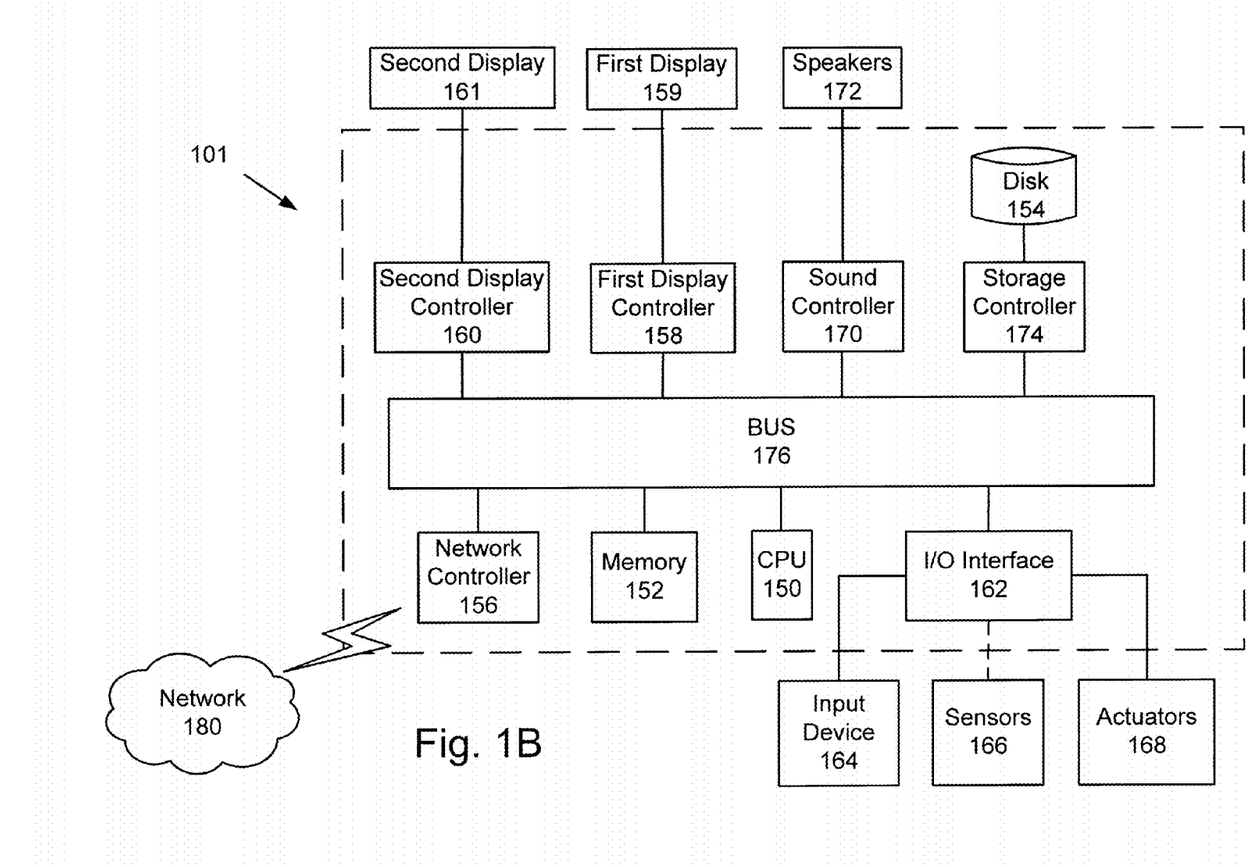
FIG. 1B shows a schematic diagram of an implementation of the HMI warning apparatus.

FIG. 1B shows an implementation of the HMI warning apparatus 101. Next, a hardware description of the HMI warning apparatus 101 according to exemplary implementations is described with reference to FIG. 1B. In FIG. 1B, the HMI warning apparatus 101 includes a CPU 150 which performs the processes described herein. Process data and instructions may be stored in memory 152. Processes and instructions may also be stored on a storage medium disk 154 such as a hard disk drive (HDD), solid state drive (SSD), or portable storage medium or may be stored remotely. Further, this disclosure is not limited by the form of the computer-readable media on which the instructions are stored. For example, the instructions may be stored on CDs, DVDs, in FLASH memory, RAM, ROM, PROM, EPROM, EEPROM, hard disk or any other information processing device with which the HMI warning apparatus 101 communicates, such as a server or computer.

Further, aspects of this disclosure may be provided as a utility application, background daemon, or component of an operating system, or combination thereof, executing in conjunction with CPU 150 and an operating system such as Microsoft Windows 7, UNIX, Solaris, LINUX, Apple MAC-OS and other operating systems.

CPU 150 may be a Xenon or Core processor from Intel of America or an Opteron processor from AMD of America, or may be other processor types that would be recognized by one of ordinary skill in the art, such as an ARM-based processor. The CPU 150 may be implemented on an FPGA, ASIC, PLD or using discrete logic circuits, as one of ordinary skill in the art would recognize. Further, CPU 150 may be implemented as multiple processors cooperatively working in parallel to perform the instructions of the inventive processes described above.

The HMI warning apparatus 101 in FIG. 1B also includes a network controller 156, such as an Intel Ethernet PRO network interface card from Intel Corporation of America, for interfacing with network 180. The network 180 can be a public network, such as the Internet, or a private network such as an LAN or WAN network, or any combination thereof and can also include PSTN or ISDN sub-networks. The network 180 can also be wired, such as an Ethernet network, or can be wireless such as a cellular network including EDGE, 3G and 4G wireless cellular systems. The wireless network can also be WiFi, Bluetooth, or another wireless form of communication.

The HMI warning apparatus 101 further includes a first display controller 158 and a second display controller 160, such as a NVIDIA GeForce GTX or Quadro graphics adaptor from NVIDIA Corporation of America that respectively interface with a corresponding first display 159, such as a projection device ins a heads-up display, and second display 161, such as an LCD navigational screen.

The HMI warning apparatus 101 further includes a general purpose I/O interface 162 interfaces with an input device 164 as well as sensors 166 that can include the driver-monitor device 102. The general purpose I/O interface 162 can also connect to a variety of actuators 168 including the haptic-warning device 118.

A sound controller 170 is also provided in the HMI warning apparatus 101, such as Sound Blaster X-Fi Titanium from Creative, to interface with speakers/microphone 172 thereby providing sounds and/or music. The sound controller 170 and speakers/microphone 172 can be the auditory-warning device 116.

The general purpose storage controller 174 connects the storage medium disk 154 with communication bus 176, which may be an ISA, EISA, VESA, PCI, or similar, for interconnecting all of the components of the HMI warning apparatus 101. A description of the general features and functionality of the display 160, keyboard and/or mouse 164, as well as the display controller 158, storage controller 174, network controller 156, sound controller 170, and general purpose I/O interface 162 is omitted herein for brevity as these features are known.

Figure 2:
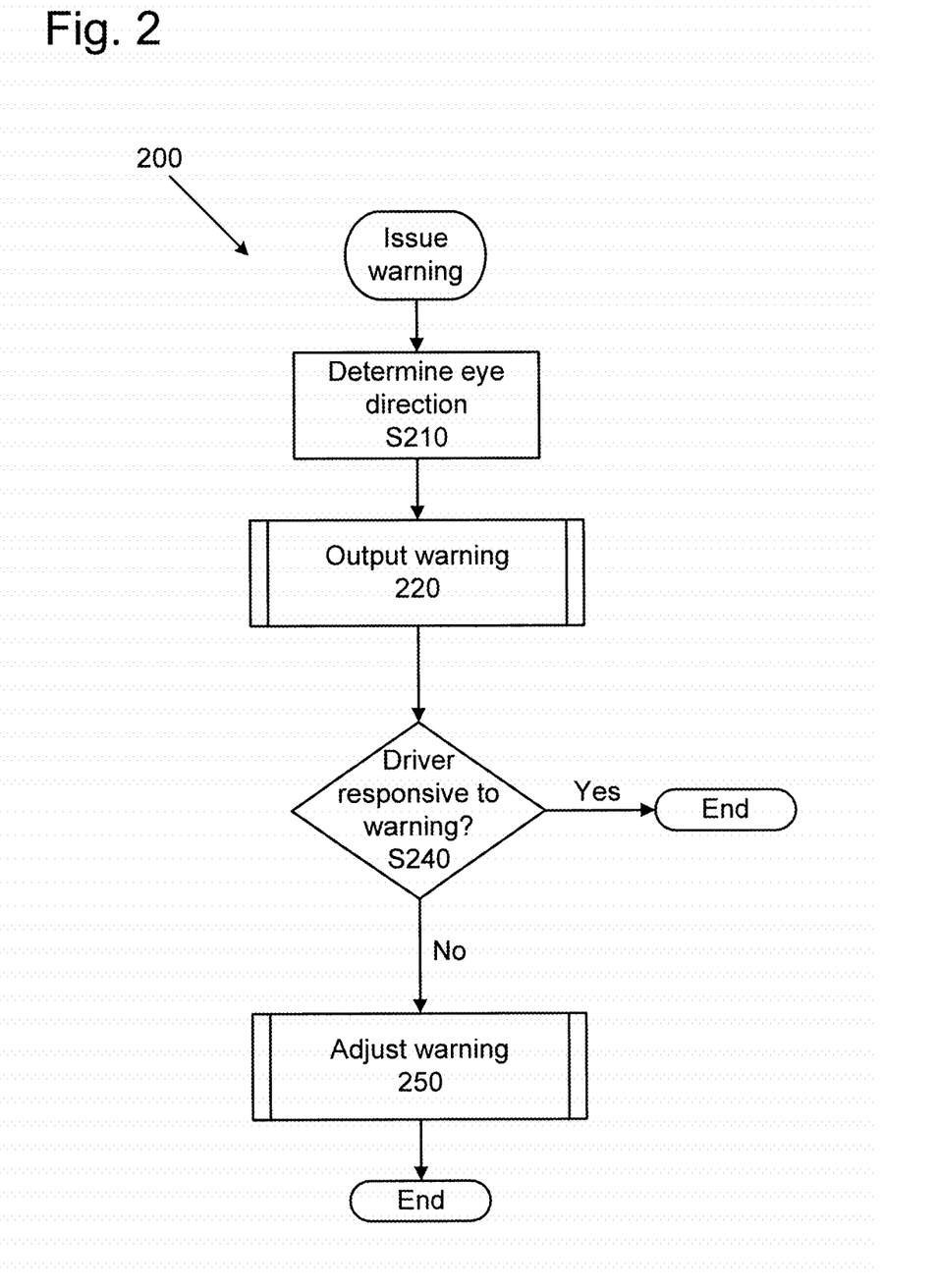
FIG. 2 shows a flow diagram of an implementation of an HMI method.

FIG. 2 shows a flow chart of a HMI warning method 200, which is an algorithm process that can be executed by the HMI warning device 101.

The method 200 begins after a warning is issued. A warning may be issued by a conventional warning system when, e.g., a lane deviation is detected or when a collision is expected. There are many different types of warnings that can be communicated. Some warnings may be urgent (e.g., when a collision is imminent). Other warnings may not be urgent (e.g., a congested-traffic warning, a low-fuel warning of, or vehicle-maintenance warning). The warning can be interpreted broadly to mean any message that is temporary nature.

Some motor vehicle safety technologies, such as collision avoidance systems, monitor the environment for hazards and adapt the motor vehicle to compensate for hazards. The environment outside the vehicle is monitored using a variety of sensors, such as radars, infrared, and optical detectors to detect collision threats. The warning would be any message communicated to the driver related to these hazards.

Warnings not directly related to an imminent collision can also improve motor vehicle safety. For example, motor vehicles can be equipped with sensors and wireless communication systems for monitoring pedestrians or changing traffic patterns.

In still other motor vehicle warning systems, driver monitor cameras can be used to monitor driver fatigue and to warn/awaken the driver when it appears they have fallen asleep at the wheel. In addition to detecting whether the driver's eyes are open or shut, these driver monitor cameras can perform eye tracking to determine if the driver is paying attention to the road or their attention is distracted elsewhere. A warning can be any message communicated to alert and direct the driver's attention.

In the first step S210, the computation processor 104 obtains information related to the viewing angle of the driver (i.e., the eye direction).

In process 220, the warning is output using a primary warning device or a combination of primary and augmenting warning devices. These warning devices may include: the primary-visual in-vehicle warning device 108, the secondary-visual in-vehicle warning devices 110, the portable device 114, the auditory-warning device 116, and the haptic-warning device 118.

In an implementation, the primary warning devices is chosen based on the viewing angle of the driver. The choice of primary warning device can also include considerations of the type of warning and how the primary warning device will be used in combination with the augmenting warning devices. For example, in an implementation, when the primary warning device is a visual warning device (i.e., the primary-visual in-vehicle warning device 108, the secondary-visual in-vehicle warning devices 110, or the portable device 114), the primary warning device is augmented by the auditory warning device that outputs a warning at an eyes-on-device level. When the primary warning device is the auditory warning device, the auditory-warning device outputs a warning at the no-eyes-on-device level and the auditory warning device can be augmented by visual devices providing directional cues to the hazard.

In addition to basing the choice of warning device on the driver's viewing angle, the choice of warning devices and the warning output can also be tailored to the type and nature of the hazard giving rise to the warning. The choice of warning devices and warning outputs is selected to more effectively alert the driver to the warning and/or hazard and to elicit the driver's appropriate response. For example, visual warnings on devices within the driver's view are more effective than visual warnings on devices outside of the driver's view. Additionally, some hazards may require warnings tailored to stimulate conscious deliberation (e.g., a GPS real-time traffic warning); while other hazards may require warnings tailored to elicit quick and instinctive reaction (e.g., an imminent collision). Additionally, some warnings can be tailored to provide directional cues alerting the driver to a hazard location (e.g., a foreign object approaching the vehicle's side); while other warnings are direction independent (e.g. a driver fatigue warning). Similarly, a haptic accelerator pedal warning may be more effective at inducing braking with a short reaction time; while visual and auditory devices may be more effective at alerting the driver to make decision regarding obstacles outside the vehicle.

Some implementations of the output warning process 220 utilize driver viewing angle information from the driver-monitor device 102 to choose (i.e., to determine by circuitry) the primary and augmenting warning devices.

After outputting the warning in process 220 the method 200 proceeds to step S240. Step S240 inquiries whether the driver has properly responded to the warning. If the driver's response is adequate, then the method comes to an end. Otherwise, the method 200 proceeds to process 250 where the output warning is adjusted to more effectively warn the driver.

In the adjust warning process 250, the driver's response is monitored using the driver-monitor device 102. Other sensors can also be used to monitor the driver's response (e.g., brake sensors and a "hands on the wheel" grip sensor included in the steering wheel to monitor whether the driver's hands are properly grasping the steering wheel), where these other sensors provide additional information about the driver's response. A grip sensor can include one or more tactile, pressure, or capacitive sensors, where output signals therefrom can be utilized to determine how the driver's hands are grasping the steering wheel. A database can store positions of proper or acceptable hand placements on the steering wheel, and detected positions or contact pressures can be compared with the stored positions to determine whether the driver's hands are properly grasping the steering wheel. The detection of hands on the wheel can be used to determine whether the driver is responsive to a warning. Also, the lack of detecting the hands on the wheel or an improper positioning can trigger a warning. An optical sensor, such as a camera, can also detect hand position, either collaboratively with the grip sensor or alone.

If changes related to the driver indicate that the driver is in the process of responding appropriately to the warning, then the warning level can be maintained at its current level or can be maintained at an attenuated level where appropriate. If, however, there are not indications that the driver is in the process of responding appropriately, then the warning level can escalate increasing the urgency of the warning and making the warning output more captivating by changing the intensity, quality, pattern, volume, color, size, or text of the warning output. These changes and other augmentations to a warning can be applied to, e.g., a vibration, sound, light, or other forms of energy output that are emitted as the warning output. The process 250 can be an iterative loop, whereby after changing the warning level, the process 250 continues to monitor the driver's response and correspondingly adjusts the warning until either the driver has fully responded to the warning and/or the hazard is no longer present. The method 200 ends after completing the adjust warning process 250.

In one implementation where the HMI apparatus includes both a driver monitor device 102 and a grip sensor in the steering wheel, the driver's response to a warning is monitored by both detecting changes in the driver's viewing angle using the driver monitor device 102 and monitoring the driver's grip on the steering wheel. The desired response to warning outputs will be both that the driver's view is directed toward the road ahead—eyes on the road—and hands griping the steering wheel—hands on the wheel. When the driver is determined to not satisfy either the eyes-on-the-road or hands-on-the-wheel conditions, then the warning outputs are escalated as discussed above for the process 250.

Figure 3:
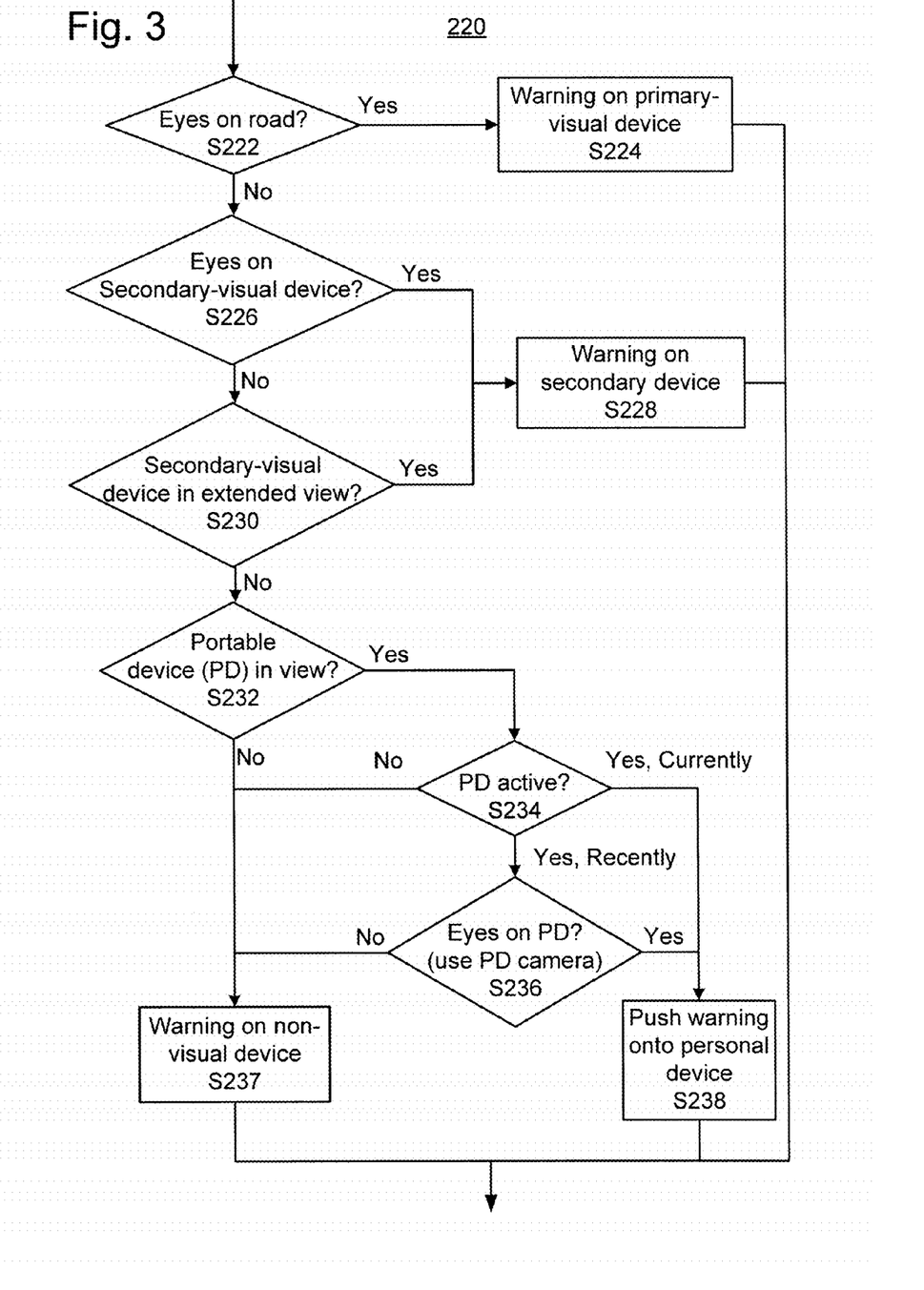
FIG. 3 shows a flow diagram of an implementation of an output warning process.

FIG. 3 shows an implementation of the output warning process 220.

The first step S222 of the output warning process 220 determines whether the driver's viewing angle is straight ahead (i.e., eyes are on the road). If the viewing angle is on the road, then the primary-visual in-vehicle warning device 108 is within the driver's direct view, and in step S224 the warning is output on the primary-visual in-vehicle warning device. In an implementation the output of the warning on the primary-visual in-vehicle warning device 108 is accompanied by warnings on other warning devices such as the auditory-warning device 116 in order to more effectively draw the driver's attention to the hazard. If the viewing angle is not on the road, the process 220 proceeds from step S222 to step S226. In an implementation, warnings are always output to the primary-visual in-vehicle device, and the first step S222 may be performed to determine whether another warning device is needed or recommended.

In step S226, the output warning process 220 inquires whether the driver's viewing angle includes a direct view of the secondary-visual in-vehicle warning devices. In step S228, if the secondary-visual in-vehicle warning devices are within the driver's direct view, then the warning is output on those secondary-visual in-vehicle warning devices 110 that are within the driver's direct view. In an implementation the output of the warning on the secondary-visual in-vehicle warning devices is accompanied by warnings on other warning devices such as the auditory-warning device 116 in order to more effectively draw the driver's attention to the warning and hazard. If the secondary-visual in-vehicle warning devices are not within the driver's direct view, then the process 220 proceeds from step S226 to step S230.

In step S230, the output warning process 220 inquires whether the driver's viewing angle is within the extended view of the secondary-visual in-vehicle warning devices. In step S228, if the secondary-visual in-vehicle warning devices are within the driver's extended view, then the warning is output on those secondary-visual in-vehicle warning devices 110 within the driver's extended view. In an implementation the output of the warning on the secondary-visual in-vehicle warning devices is accompanied by warnings on other warning devices such as the auditory-warning device 116 in order to more effectively draw the driver's attention to the warning or hazard. If the secondary-visual in-vehicle warning devices are not within the driver's extended view, then the process 220 proceeds from step S230 to step S232.

In step S232, the output warning process 220 inquires whether the driver's view is directed toward the portable device 114. If the portable device 114 is within the driver's direct view or it is unknown whether the portable device is within the driver's view, then the process 220 proceeds to a second inquiry, at step S234, as to whether the portable device is active. If the portable device 114 is not within the driver's direct view, then the process 220 proceeds to step S237 wherein a warning is output on a non-visual warning device.

In step S234, the output warning process 220 inquires whether the portable device is currently active, has recently been active, or is inactive. To determine the activity level of the portable device 114, the computation processor 104 can inquire about the activity log of the portable device 114, which may be connected to the HMI warning apparatus 101 by Universal Serial Bus (USB) connection, Bluetooth, or other wireless communication method. The computation processor 104 can store and maintain the activity log by tracking data transmitted from the portable device 114 to the HMI warning apparatus 101 by a communication channel. In analyzing the activity log of the portable device 114, the computation processor 104 can consider indicia of recent use of the portable device 114 including: the key stream, scrolling activity, and touch screen activation. The analysis of the activity log categorizes the activity level of the portable device 114 into one of three categories: currently active, recently active, or inactive.

If the portable device 114 is currently active, then, in step S238, the network control circuitry 112 signals to the portable device 114 and a warning is pushed onto the portable device 114.

If the portable device 114 was recently active, then in an implementation where the portable device 114 has a camera, the camera is used to determine if the driver is looking at the portable device 114. This determination can be performed either by processing the camera image on the portable device 114 using software installed on the portable device 114, or by communicating the camera image to the computation processor 104 where the image is processed to determine whether the driver is looking at the portable device 114. If the portable device 114 is recently active, and the driver's view includes portable device 114 or it is unknown whether the driver's view includes portable device 114; then, in step S238, the network control circuitry 112 signals to the portable device 114 and a warning is pushed onto the portable device 114.

In an implementation, if process 220 proceeds to step S238 and the warning is pushed onto the portable device 114 in step S214, then the warning on the portable device 114 is augmented by warnings on other warning devices such as the auditory-warning device 116 in order to more effectively draw the driver's attention to the warning.

If, at step S234, the portable device is not active or the portable device is recently active but, at step S236, the portable device is not within the driver's view; then the process 220 proceeds to step S237 wherein a warning is output on a non-visual warning device (e.g., the auditory-warning device 116 or the haptic-warning device 118). The non-visual warning is output at the no-eyes-on-device level and can be augmented by a warnings output on a visual warning device.

Step S237 may be reached when all of the in-vehicle visual displays 108 and 110, and the portable device 114 are each not within the driver's view. In step S237 the non-visual warning devices (i.e., the auditory-warning device 116 and the haptic-warning device 118) are used to output a warning to the driver. In an implementation, both the auditory-warning device 116 and the haptic-warning device 118 each output the warning to the driver. In another implementation, the auditory-warning device 116 and not the haptic-warning device 118 outputs the warning to the driver. In another implementation the haptic-warning device 118 and not the auditory-warning device 116 outputs the warning to the driver. Also, in an implementation, the visual warning devices output warnings to augment the warnings output by the auditory-warning device 116 and/or the haptic-warning device 118.

In another implementation, after completing step S224, the process 220 can proceed to step S226. Also, after completing step S228, the process 220 can proceed to step S232. Here, step S237 may be reached only if none of the visual warning devices are within the driver's view. Otherwise this implementation of process 220 can operate according to FIG. 3.

In another implementation, the process 220 always includes outputting a warning on the primary visual device 108 even when the primary visual device 108 is not within the driver's direct view. If the primary visual device 108 is not within the driver's direct view, then the inquiry at step 222 determines whether a second warning output on a second device is also desired. When the driver's eyes are not on the road and thus the driver's view does not include the primary visual device 108, then the process 220 proceeds to step S226 in an inquiry for a second warning device and output. If at step S222 it is determined that the driver's eyes are on the road and therefore the primary visual device is within the direct view of the driver, then a warning is not output on a second warning device. In one implementation, the warning on the primary warning device will also be accompanied by a warning output by an augmenting non-visual warning device, such as a sound from an audio speaker, in addition to any second or additional warnings output by a second warning device or additional warning devices.

Figure 4:
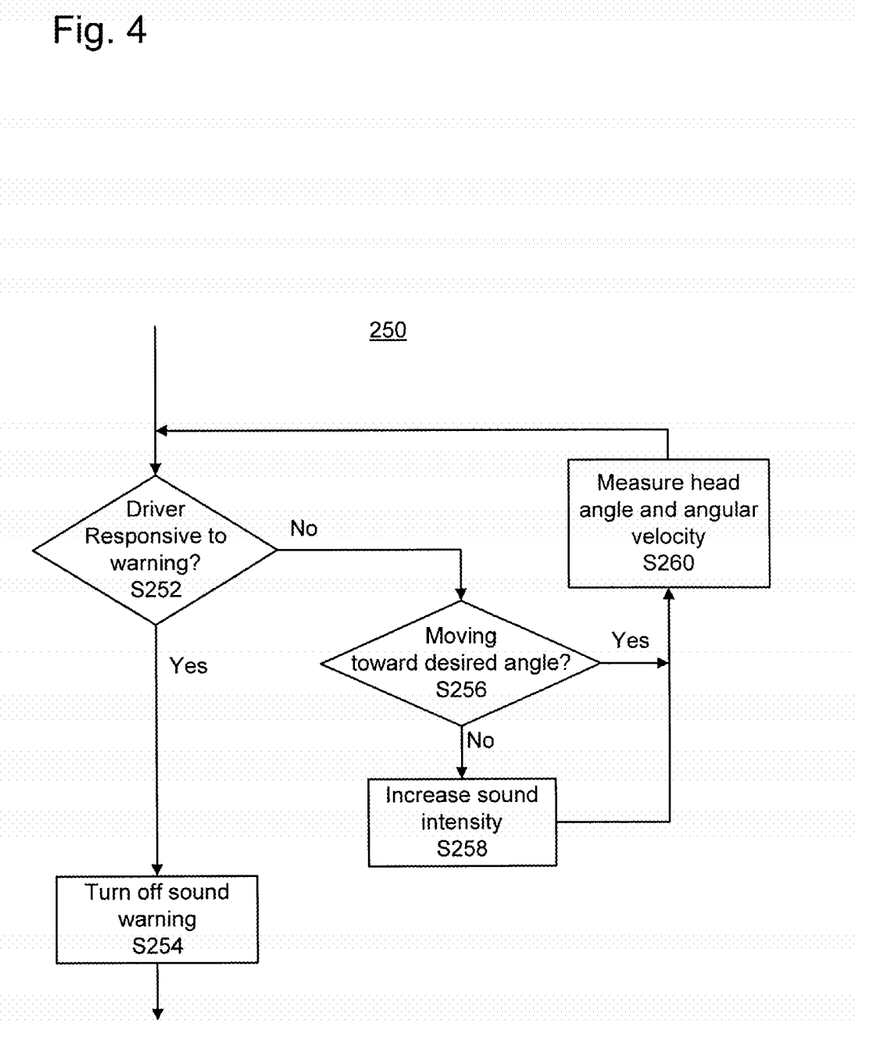
FIG. 4 shows a flow diagram of an implementation of an adjust warning process.

FIG. 4 shows an implementation of the adjust warning process 250, and in one implementation is specific to determining whether the driver is responsive to a warning solely based on the driver's head angle (e.g., the driver's current viewing angle). The adjust warning process 250 begins at step S252 by inquiring whether the driver is responsive to the warning. In an implementation, the difference between the driver's current viewing angle and the desired viewing angle is used to determine whether the driver is responsive to the warning.

At step S252, if the driver is responsive to the warning, then the process 250 proceeds to step S254. At step S254, the warning sound can be maintained at its current level or it can be turned off.

At step S252, if the driver is not responsive to the warning, then the adjust warning process 250 proceeds to inquiry at step S256, whether driver's viewing angle is changing to bring it closer to the desired viewing angle.

At step S256, if the driver's viewing angle is moving towards the desired viewing angle, then process 250 proceeds to step S260, where additional measurements are made to determine the driver's current viewing angle in order to compare it with the previous viewing angles and the desired viewing angle. If, on the other hand, the driver's viewing angle is not moving towards the desired viewing angle, then process 250 proceeds to step S258 where the sound is changed in quality, volume, and/or pattern in order to convey greater urgency and better captivate the driver's attention.

After completing step S258, the process 250 proceeds to step S260 to obtain information related to the driver's current viewing angle. Next, the process 250 returns to the beginning of the loop at step S252, and the loop is repeated until the driver is responsive to the warning. In an implementation, the loop also includes exit criteria allowing the loop to exit if the warning is no longer applicable or if a maximum number of loop iterations is reached.

In an implementation of the HMI warning method 200, rather than ending after the adjust warning process 250 the method 200 continues by looping back to step S210, and method 200 operates as a continuous loop until the loop is broken when the original "issue warning" is rescinded. While the "issue warning" is not rescinded the method 200 will continue, in process 220, adapting the warning devices and outputs according to the driver's current viewing angle, and, in process 250, adjusting the intensity of the warning. This loop of continuous adaptation and adjustment continues until the hazard originating the warning has been resolved and the "issue warning" is rescinded thus breaking the loop.

Figure 5:
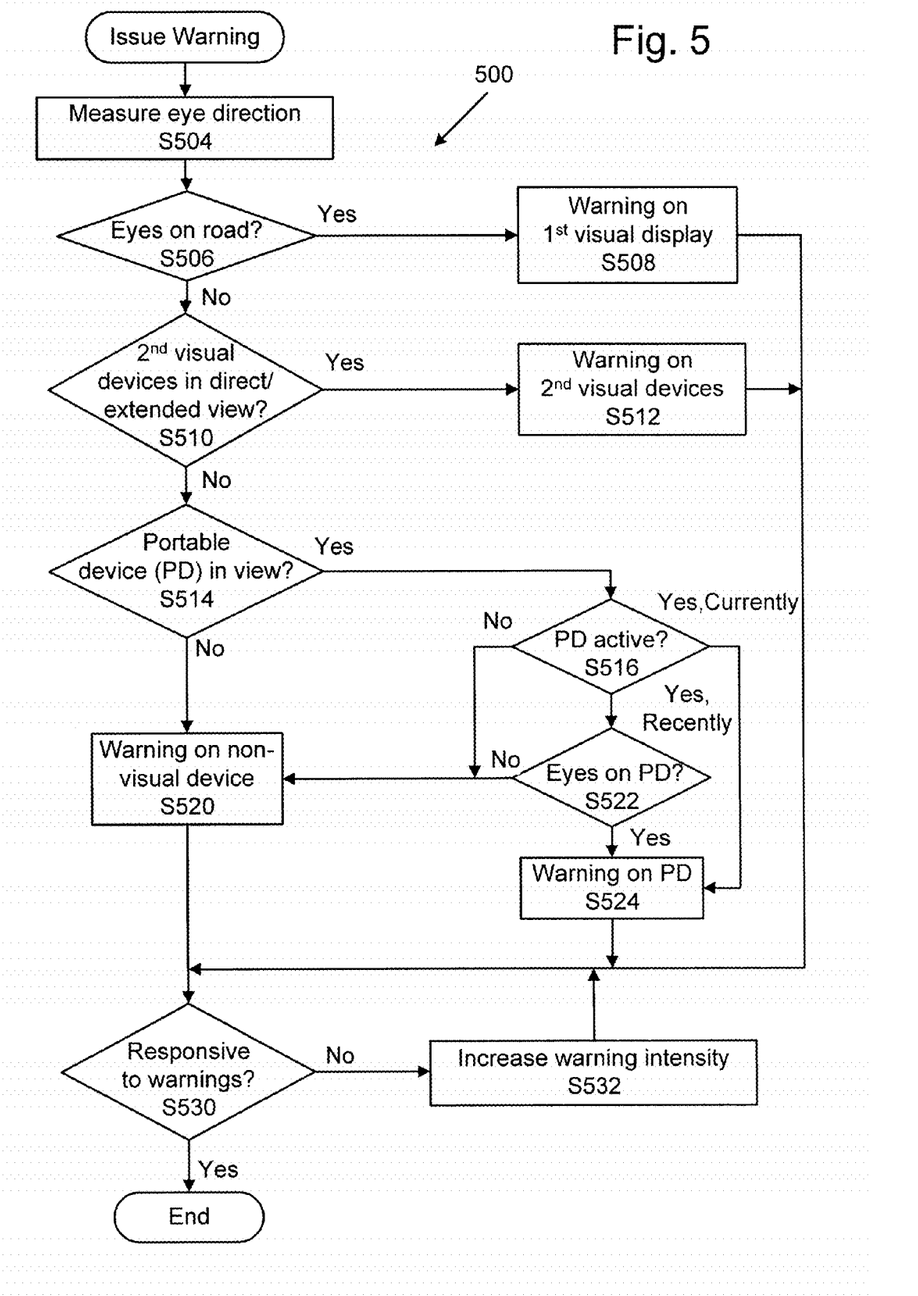
FIG. 5 shows a flow diagram of another implementation of an HMI method.

FIG. 5 shows an implementation of a HMI warning method, HMI warning method 500. The method begins after a warning is issued.

The first step S504 determines the driver's viewing angle from the information related to the driver's viewing angle that is obtained from the driver-monitor device 102. Next, at step S506, there is an inquiry as to whether the driver's viewing angle indicates that the driver's eyes are on the road. If the driver's eyes are on the road, then method 500 proceeds to step S508 by outputting a warning on the primary-visual in-vehicle warning device 108. If the driver's eyes are not on the road the method proceeds to step S510.

Next, at step S510, there is an inquiry as to whether the driver's viewing angle includes any of the secondary-visual devices 110. If the driver's direct and extended view includes any of the secondary-visual devices 110, then method 500 proceeds to step S512. In S512, a warning is output on the secondary-visual in-vehicle warning devices 108. Further, the step S512 can include a further inquiry into which of the secondary-visual in-vehicle warning devices 108 is within the driver's view and selectively output warnings on only those secondary-visual in-vehicle warning devices 108 is within the driver's viewing angle. Also, the type and intensity of the warning output in step S512 can further depend on whether the device outputting a warning is within the direct view or is only within the extended view of the driver. If the driver's direct view and extended view do not include any of the secondary-visual devices 110, then method 200 proceeds to step S514.

Next, at step S514, there is an inquiry as to whether the driver's viewing angle includes the portable device 114. If the portable device 114 is not within the driver's view, then method 500 proceeds to step S520. If the portable device 114 is within the driver's view or if there is an inconclusive result as to whether the portable device 114 is within the driver's view, then the method 500 proceeds to step S516. In an implementation, the computation processor may not have information about the location of the portable device within the motor vehicle. In this implementation, the method will skip step S514 and instead proceed directly from step S510 to step S516.

At step S516 there is an inquiry whether the portable device 114 is active. If the portable device 114 is currently active, then a warning is pushed onto the portable device 114 at step S524. If the portable device 114 is not currently active and is not recently active then the method 500 proceeds to step S516. If the portable device 114 is recently active, then the method 500 proceeds to the inquiry at step S522.

At step S522 there is an inquiry whether in addition to the portable device 114 being within the driver's view, the driver is also looking at the portable device 114. If the portable device 114 is equipped with a camera, this inquiry as to whether the driver is looking at the portable device 114 can be answered by processing an image taken by the portable-device camera. If it is determined that the driver is actually looking at the portable device 114 or the answer to the inquiry is inconclusive, then method 500 proceeds to step S524. In step S524, a warning is pushed onto the portable device. Otherwise, the method proceeds to step S520.

At step S520 a warning is output using a non-visual warning device (e.g., the auditory-warning device 116 or the haptic-warning device 118). Although step 520 is the only step explicitly stating that a warning is output using a non-visual device, in steps other than S520 (i.e., steps S508, S512, and S524) a non-visual warning device can output a warning at an eyes-on-device level to augment the warnings output by a visual warning devices. Similarly, in step S520 the primary warning output from the non-visual warning device, which is at the no-eyes-on-device level, can be augmented warning outputs on the visual warning devices.

At step S524 a warning is pushed onto the portable device 114, and the portable device 114 outputs the warning to the driver.

Each of steps S508, S512, S524, and S520 are directly succeeded by the inquiry at step S530. Step S530 inquiries whether the driver is responsive to the outputs of the warning. To answer this inquiry the computation processor 104 can consider various indicia of the driver's response. Among these indicia are the relative differences between the driver's current viewing angle, the driver's previous viewing angle, and the desired viewing angle. In an implementation, the computation processor 104 can also consider input from other sensors such as the brake sensor and the angle of the steering wheel. If the driver is responsive to the warning, then method 500 ends. Otherwise, the method proceeds to step S532, wherein the warning is changed to better captivate the driver's attention and better elicit the desired response. For example, a different color, sound, volume, pattern, etc. can be used to output the warning. After step S532, the method 500 loops back to the inquiry at step S530 and repeats the loop until the driver adequately responds to the warning outputs, or until the "issue warning" is rescinded.

Figure 6:
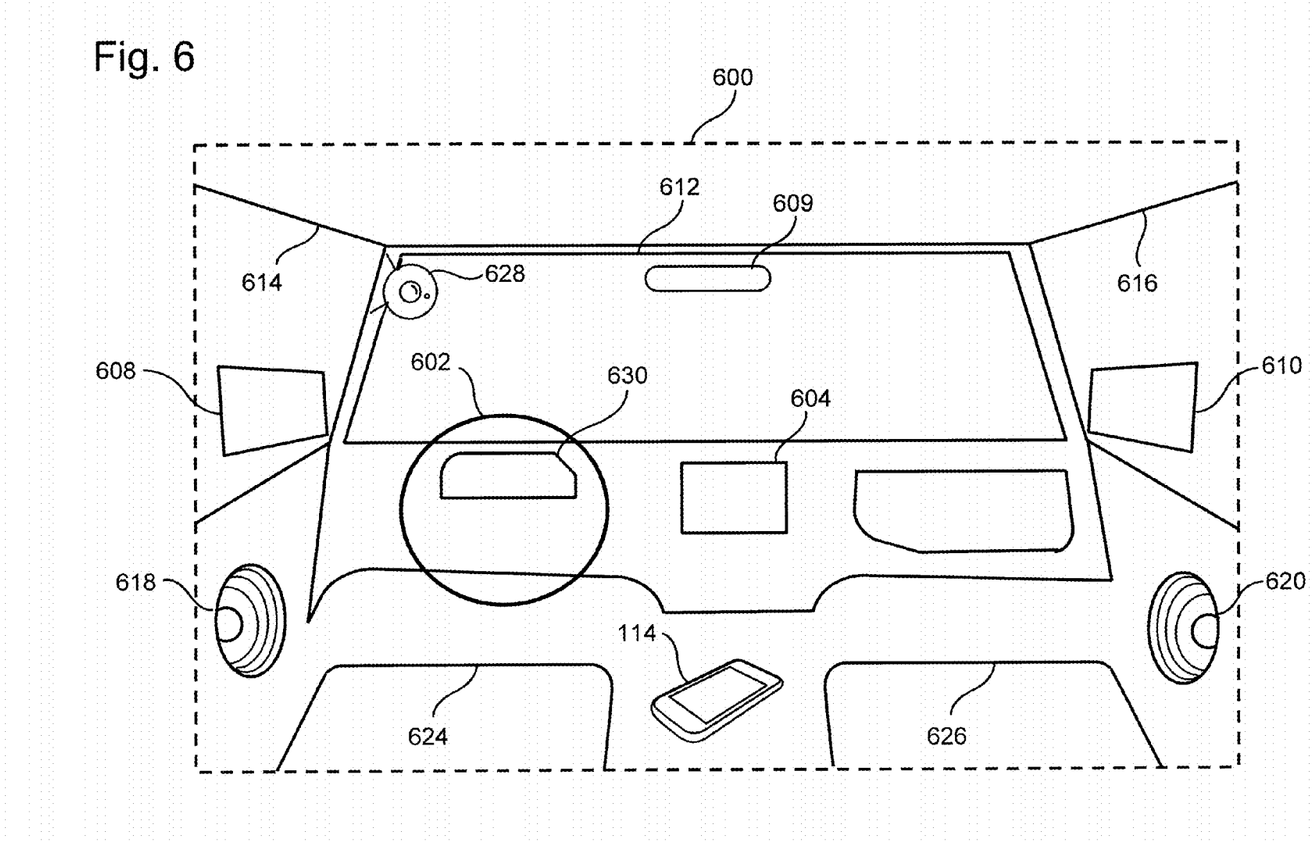
FIG. 6 is a view of an interior compartment of a motor vehicle including a HMI apparatus.

FIG. 6 illustrates a schematic view of an implementation showing the locations of some components of the HMI warning system 101 as seen from within interior compartment 600 of a motor vehicle. The interior compartment 600 of the motor vehicle includes a windshield 612, a left window 614, and a right window 616. The primary-visual in-vehicle warning device 108 can be a heads up display (not shown) that is incorporated with the windshield 612 in order to visually convey information to the driver when the driver's view is directed towards the road ahead.

The interior compartment 600 of the motor vehicle includes a left-side-view mirror 608, an instrument cluster 630, a navigation screen 604, a right-side-view mirror 610, and a rearview mirror 609. The secondary-visual in-vehicle warning devices can be incorporated in the left-side-view mirror 608, the instrument cluster 630, the navigation screen 604, the right-side-view mirror 610, and/or the rearview mirror. The secondary-visual in-vehicle warning devices can be lights, light emitting diodes (LEDs), liquid crystal display (LCD) screens, or LED screens.

The interior compartment 600 of the motor vehicle includes a steering wheel 602, a left seat 624, a right seat 626, a gas pedal, a brake pedal, a seat belt, and a heating ventilation and air conditioning (HVAC) system. The haptic-warning device 118 can be incorporated in the steering wheel 602, the left seat 624, the gas pedal, the brake pedal, the seat belt, and/or the HVAC system. The haptic-warning device 118 can warn the driver by creating a vibration or other mechanical actuation that is sensed by the driver. Also, the haptic-warning device 118 can alert the driver's attention by other tactile means such as (e.g., blowing air at the driver using the HVAC system, or by tensioning the seat belt).

The interior compartment 600 of the motor vehicle includes a left speaker 618 and a right speaker 620. These speakers can be incorporated in the auditory warning device.

The interior compartment 600 of the motor vehicle includes a driver monitor camera 628. The driver monitor camera 628 can be the driver-monitor device 102. The driver monitor camera can be located on the steering column, or the driver monitor camera can include multiple cameras located to either side of the steering wheel in a stereo camera implementation. Moreover, the driver monitor camera can be located to one side of the steering wheel as shown in FIG. 6. The driver-monitor device can also include a wearable technology device, such as Google Glass™, or a camera on the portable device 114. The portable device 114 can be located inside the motor vehicle 100. A camera on the portable device 114 can be used as the driver monitor camera 628. The portable device 114 can interface with the HMI warning apparatus 101 through the network control circuitry 112. The portable device 114 can output warnings visually, audibly, and/or haptically.

In an implementation, the visual warning devices can include non-visual outputs, such as audio speakers to output sound. Also, the non-visual warning devices can include visual outputs. The portable device can include visual outputs (e.g., on an LCD screen), auditory outputs (e.g., audio speakers or a piezoelectric transducer), and haptic outputs (e.g., vibrations).

Figure 7:
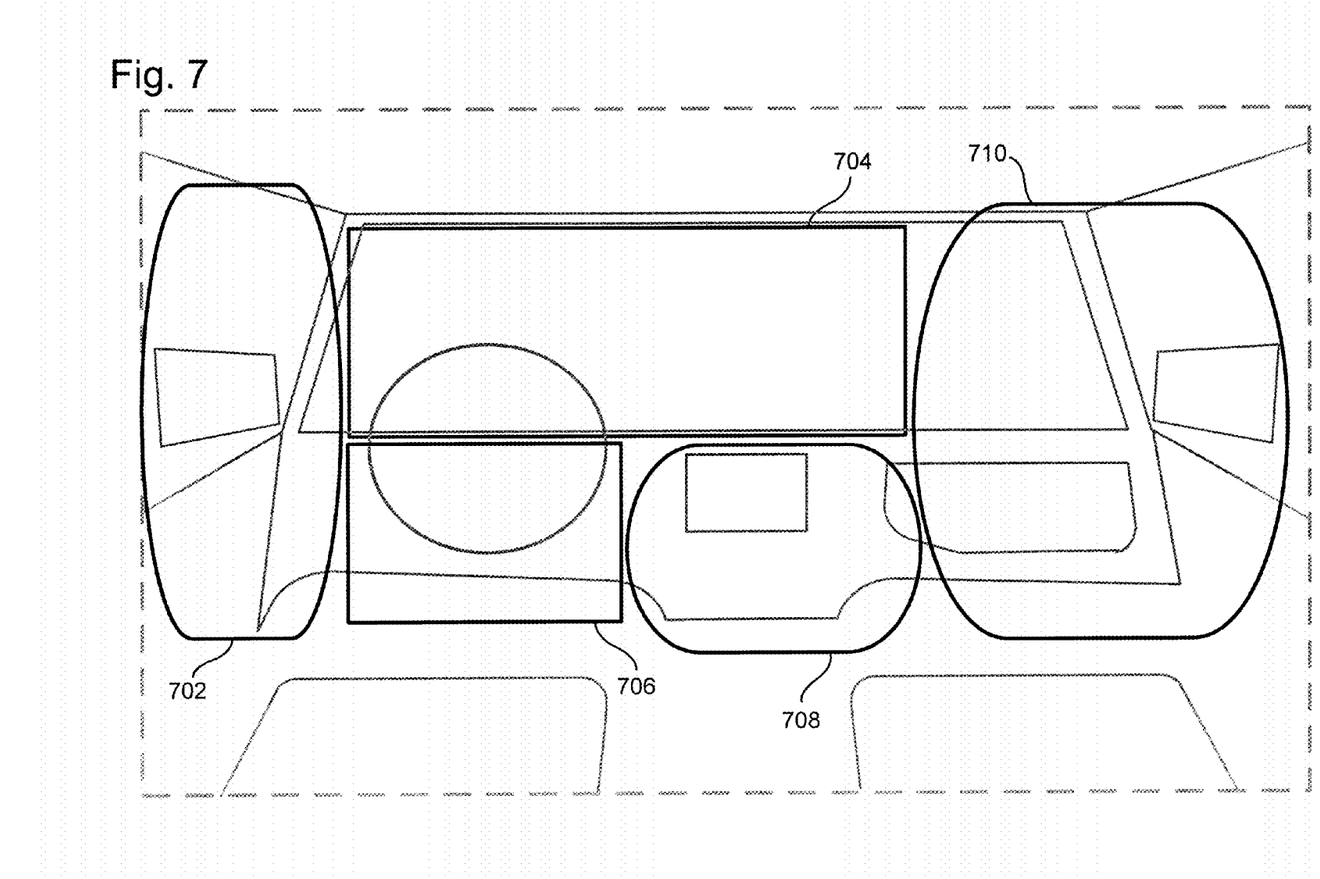
FIG. 7 is a view of an implementation of viewing angle regions of a interior compartments of a motor vehicle.

FIG. 7 shows an exemplary implementation of the driver viewing angle regions for the HMI warning apparatus. The driver viewing angle regions include a far-left view 702, a road-ahead view 704, a lower-left view 706, a lower-center view 708, and a far-right view 710. In addition to these five views, a sixth view can be included. The sixth view is the view of the portable device 114. This portable device view can overlap with any of the five enumerated viewing angles, or it can be non-overlapping with the five enumerated viewing angles.

In an implementation, if the driver's viewing angle includes the road-ahead view 704, then a warning is displayed on the primary-visual in-vehicle warning device 108 augmented by the auditory-warning device 116 outputting a warning at the eyes-on-device level.

In an implementation, if the driver's viewing angle includes the far-left view 702 and the secondary-visual in-vehicle warning devices 110 include a visual display in the left-side-view mirror 608, then a warning is displayed on the left-side-view mirror 608 augmented by the auditory-warning device 116 outputting a warning at the eyes-on-device level. In an implementation, the warning on the left-side-view mirror 608 can be augmented by a warning displayed on the primary-visual in-vehicle warning device 108.

In an implementation, if the driver's viewing angle includes the lower-left view 706 and the secondary-visual in-vehicle warning devices 110 include a visual display in the instrument cluster 630, then a warning is displayed on the instrument cluster 630 augmented by the auditory-warning device 116 outputting a warning at the eyes-on-device level. In an implementation, the warning on the instrument cluster 630 can be augmented by a warning displayed on the primary-visual in-vehicle warning device 108.

In an implementation, if the driver's viewing angle includes the lower-center view 708 and the secondary-visual in-vehicle warning devices include a visual display in the navigational screen 604, then a warning is displayed on the navigational screen 604 augmented by the auditory-warning device 116 outputting a warning at the eyes-on-device level. In an implementation, the warning on the navigational screen 604 can be augmented by a warning displayed on the primary-visual in-vehicle warning device 108. Further, if the portable device 114 is active (i.e., currently active or recently active) and within the driver's direct or extended viewing angle, then the warning can also be pushed to the portable device 114 to augment the warning on the navigational screen 604.

If the driver's viewing angle is between the lower-center view 708 and the lower-left view 706, then neither the instrument cluster 630 nor the navigational screen 604 will be in the direct view of the driver, but both may be in the extended view of the driver. In one implementation, when no visual displays are within the direct view of the driver, then the method of determining which visual display devices output warnings will inquiry whether any visual display devices are within the extended view of the driver. Whereas the direct view of the driver occupies an essentially conical solid angle centered on the driver's direct line of sight, the extended view of the driver encompasses a donut shaped solid angle surrounding the driver's direct view. The extended view of the driver includes peripheral vision of objects that are not the direct focus of the driver's attention, but that the driver can see without changing the driver's line of sight. If no visual displays are within the direct viewing angle of the driver, but at least on visual display is within the extended view of the driver, then the warning is output on all visual devices within the extended view of the driver. In an another implementation, the warning is output on all visual devices within the direct and extended views of the driver regardless of whether a visual warning device is or is not within the direct view of the driver.

In an implementation, if the driver's viewing angle includes the far-right view 710 and the secondary-visual in-vehicle warning devices include a visual display in the right-side-view mirror 610, then the warning is displayed on the right-side-view mirror 610 augmented by the auditory-warning device 116 outputting a warning at the eyes-on-device level. In an implementation, the warning on the right-side-view mirror 610 can be augmented by a warning displayed on the primary-visual in-vehicle warning device 108.

In an implementation, if the portable device 114 is within the driver's view, and the primary-visual in-vehicle warning device 108 and secondary-visual in-vehicle warning devices 110 are not within the driver's; then the warning is pushed to the portable device if the portable device 114 is currently active or the portable device 114 is recently active and a camera on the portable device 114 confirms that the driver is looking at the portable device 114. The warning on the portable device 114 can be augmented by the auditory-warning device 116 outputting a warning at the eyes-on-device level. In an implementation, the warning on the portable device 114 can be further augmented by a warning displayed on the primary-visual in-vehicle warning device 108.

The warning method 200 and the other warning method 500 can be processes in a larger warning method. For example, the larger warning method could start before either step S210 or step S504, by outputting a warning without regard to the driver's viewing angle. Also, the warning methods method 200 and method 500 can be integrated as part of a larger process operating on the computation processor 104 and/or on a remote computing platform. The larger process can track a driver's history of viewing angles and reaction times in response to warning events in order to learn the driver's tendencies and to better adapt the combinations of warning devices and outputs in order to better capture and direct the driver's attention to hazards.

Furthermore, in one example, a driver's viewing angle can be between an instrument cluster and a navigation screen (or two other possible warning devices). The driver's viewing angle can thus be included in the extended view of both the instrument cluster and the navigation screen, but not included in the direct view of either the instrument cluster or the navigation screen. In this example, a warning can be output on at least both of these devices.

While certain implementations have been described, these implementations have been presented by way of example only, and are not intended to limit the teachings of this disclosure. The teachings herein may be implemented in a variety of other forms. Also, various omissions, substitutions, and changes may be made without departing from the spirit and teachings of this disclosure.

The invention claimed is:

1. An apparatus comprising processing circuitry configured to:
   determine which of a plurality of visual warning devices is within a first determined viewing angle of a driver; and
   signal a first visual warning device, from among the plurality of visual warning devices, to output a first visual warning when the first visual warning device is determined to be within the first determined viewing angle of the driver.

2. The apparatus according to claim 1, wherein the processing circuitry is further configured to:
   determine the viewing angle of the driver based on one of an image of the driver, an image in the direction of a view of the driver, and positional data of the driver.

3. The apparatus according to claim 2, wherein the processing circuitry is further configured to:
   determine whether none of the plurality of visual warning devices are within the first determined viewing angle of the driver; and
   signal an at least one non-visual warning device to output a first non-visual warning at a first warning level when none of the plurality of visual warning devices are within the first determined viewing angle of the driver.

4. The apparatus according to claim 3, wherein the processing circuitry is further configured to:
   determine an activity status of a portable device; and
   signal the portable device to output a portable-device warning when the portable device is determined to be active based on the activity status of the portable device.

5. The apparatus according to claim 4, wherein the processing circuitry is further configured to:
   determine whether the portable device is within the viewing angle of the driver; and
   signal the portable device to output the portable-device warning when the portable device is determined to be recently active and the portable device is determined to be within the viewing angle of the driver.

6. The apparatus according to claim 4, wherein the processing circuitry is further configured to:
   determine whether the driver is looking towards the portable device based on an image from the portable device; and
   signal the portable device to output the portable-device warning when either there is a determination that the driver is looking towards the portable device or when the determination of whether the driver is looking towards the portable device is inconclusive.

7. The apparatus according to claim 4, wherein the processing circuitry is further configured to:
   determine whether a second visual warning device of the plurality of visual warning devices is within a second determined viewing angle of the driver; and
   signal the second visual warning device to output a second visual warning when the second visual warning device is within the second determined viewing angle of the driver.

8. The apparatus according to claim 7, wherein the processing circuitry is further configured to:
   signal the at least one non-visual warning device to output an augmenting non-visual warning at a second warning level when at least one of the plurality of visual warning devices is outputting a first visual warning, wherein the second warning level is at a level that is lower than the first warning level.

9. The apparatus according to claim 8, wherein the processing circuitry is further configured to:
   modify at least one of the first visual warning, the second visual warning, the first non-visual warning, the augmenting non-visual warning, and the portable-device warning to increase a level of the respective warning when the response of the driver does not satisfy a first predetermined criterion.

10. The apparatus according to claim 7, wherein the processing circuitry is further configured to:
    determine the first visual warning device is within the first determined viewing angle of the driver according to the first determined viewing angle corresponding to a direct view of the driver; and
    determine the second visual warning device is within the second determined viewing angle of the driver according to the second determined viewing angle corresponding to an extended view of the driver.

11. The apparatus according to claim 4, wherein the processing circuitry is further configured to:
    obtain an activity log of the portable device;
    compare the activity log to an active criterion and to a recently-active criterion;
    determine the portable device is active when the activity log satisfies the active criterion;
    determine the portable device is recently-active when the activity log satisfies the recently-active criterion and does not satisfy the active criterion; and
    determine the portable device is inactive when the activity log does not satisfy the recently-active criterion and does not satisfy the active criterion.

12. The apparatus according to claim 4, wherein the at least one non-visual warning device includes at least one of a mechanical transducer in the brake pedal, a mechanical transducer in the driver's seat, a heating ventilation and air conditioning system, a mechanical transducer that tightens the seat belt, an audio speaker, a haptic warning device, and a auditory warning device.

13. The apparatus according to claim 4, wherein the plurality of visual warning devices includes at least one of a heads-up display, a navigational screen, an instrument cluster, a side view mirror, and a rear view mirror.

14. The apparatus according to claim 4, wherein:
    the at least one non-visual warning device includes a visual output;
    the portable-device warning is at least one of a visual warning, an auditory warning, and a haptic warning; and
    at least one of the plurality of visual warning devices includes a non-visual output, including an auditory output or a haptic output.

15. The apparatus according to claim 4, wherein at least one of the first visual warning, the first non-visual warning, and the portable-device warning provides directional cues that guide a view of the driver in a predetermined direction.

16. The apparatus according to claim 3, wherein the processing circuitry is further configured to:
signal at least one of the plurality of visual warning devices to output an augmenting visual warning when none of the plurality of visual warning devices are within the view of the driver.

17. The apparatus according to claim 1, wherein the processing circuitry is further configured to:
signal a first non-visual warning device to output a non-visual warning;
monitor the driver's grip on the steering wheel and monitor changes in the viewing angle of the driver to determine whether the driver is responsive to the warnings; and
when the driver is determined to not be responsive to the warnings, modify the warnings to better capture the driver's attention.

18. A method comprising:
determining which of a plurality of visual warning devices is within a determined viewing angle of a driver;
signaling a first visual warning device, from among the plurality of visual warning devices, to output a first visual warning when the first visual warning device is determined to be within the determined viewing angle of the driver;
determining which, if any, of the plurality of visual warning devices are within view of the driver;
signaling a non-visual warning device to output a first non-visual warning at a first warning level when none of the plurality of visual warning devices are determined to be within the determined viewing angle of the driver;
signaling a portable device to output a portable-device warning when a state of the portable device is determined to be active;
monitoring a response of the driver to the first visual warning, the first non-visual warning, and the portable-device warning; and
augmenting one or more of the first visual warning, the first non-visual warning, and the portable-device warning when the response of the driver does not satisfy a predetermined criterion.

19. A non-transitory computer readable storage medium including executable instruction, wherein the instructions, when executed by circuitry, cause the circuitry to perform the method according to claim 18.

20. A system comprising:
a driver-monitor device configured to detect a viewing angle of a driver;
a plurality of warning devices, including a plurality of visual warning devices and at least one non-visual warning device;
control circuitry configured to:
determine which of the plurality of visual warning devices is within the viewing angle of a driver;
signal a first visual warning device, from among the plurality of visual warning devices, to output a first visual warning when the first visual warning device is determined to be within the determined viewing angle of the driver;
signal the non-visual warning device to output a first non-visual warning when no visual warning device is determined to be within the determined viewing angle of the driver;
determine whether the driver is responsive to the first visual warning or the first non-visual warning; and
signal a portable device to output a portable-device warning when the driver is determined to not be responsive to the first visual warning or the first non-visual warning.

* * * * *